UNITED STATES PATENT OFFICE

2,353,684

ESTERS OF THE HYDROXY-STILBENE SERIES AND PROCESS OF PREPARING SAME

Karl Miescher, Riehen, and Jules Heer, Basel, Switzerland, assignors, by mesne assignments, to Ciba Pharmaceutical Products, Incorporated, Summit, N. J., a corporation of New Jersey No Drawing. Application June 3, 1939, Serial No. 277,324. In Switzerland July 2, 1938

4 Claims. (Cl. 260—479)

This invention relates to the manufacture of new esters by treating by a known method a hydroxy-compound of the stilbene series substituted in the ethylene bridge by hydrocarbon radicals with an acylating agent suitable for introducing an acid radical having more than two carbon atoms.

Parent materials for the invention are in general mono- or polyhydroxy-compounds of the stilbene series substituted in the ethylene bridge by saturated or unsaturated hydrocarbon radicals, for instance $\alpha,\alpha'$-dimethyl-4,4'-dihydroxy-stilbene, $\alpha,\alpha'$-diethyl-4,4'-dihydroxy-stilbene, $\alpha$-methyl-$\alpha'$-ethyl- 4,4'-dihydroxy-stilbene, $\alpha,\alpha'$-di-isopropyl-4,4'-dihydroxy-stilbene or monoethyl-4,4'-dihydroxy-stilbene.

Suitable acylating agents are for instance the various carboxylic acids, their anhydrides, halides or esters formed from alcohols of low molecular weight (re-esterification) or corresponding ketenes. The acyl radicals introduced may be aliphatic, cycloaliphatic, aliphatic-aromatic or aromatic, if desired containing substituents, straight chain or branched, saturated or unsaturated provided that they contain at least 3 carbon atoms. Thus there may be used as the acylating agents those which introduce the radical of propionic acid, butyric acid, crotonic acid, valerianic acid, caproic acid, caprylic acid, capric acid, lauric acid, palmitic acid, stearic acid, hexahydrobenzoic acid, benzoic acid, phenyl-acetic acid, lactic acid, succinic acid, phthalic acid, salicylic acid or formic acid. The yields are nearly quantitative.

For making mono-esters of the dihydroxy-compounds of the stilbene series the diacyl compounds thus obtained may subsequently be partially saponified under mild conditions for example by means of an alkaline agent in alcohol. In this case there occurs under the catalytic effect of the alkali a re-esterification so that less than the equivalent quantity of alkali may be used. During the conversion into the alcohol of high molecular weight the reaction is strongly accelerated. On the other hand the dihydroxy-compounds can be converted into their mono-esters by partial acylation. These mono-esters may be separated from any di-ester simultaneously formed, for example by means of a cold alkali hydroxide solution. The mono-ester may alternatively be produced in known manner by starting from a mono-ether (for example benzylether), esterifying this and then removing the ether group. The mono-ester obtained may be again treated with an acylating agent which is adapted to introduce an acid residue different from that already present so that in this manner mixed esters may be produced.

As compared with known compounds of hormone activity without steroid character these new esters have a protracted action in the growth test of the oestrus and uterus; they therefore find application in therapeutics.

The following examples illustrate the invention, the parts being by weight:

Example 1

1 part of $\alpha,\alpha'$-diethyl-4,4'-dihydroxy-stilbene is heated together with 15 parts of pyridine and 4 parts of propionic anhydride for some time at 105° C. After cooling the mixture is gradually diluted with 200 parts of water. The oil thus precipitated is extracted by ether and washed with n-sulfuric acid, water and n/10 caustic soda solution in succession. After distilling the ether the dipropionic acid ester remains and may be purified by recrystallization from dilute methanol. It melts at 106–107° C.

The same compound is obtained by heating the stilbene derivative with an excess of propionic anhydride or by causing it to react with a propionyl halide.

In similar manner there may also be obtained for example the esters of $\alpha$-methyl, $\alpha'$-ethyl-4,4'-dihydroxy-stilbene or of $\alpha,\alpha'$-diisopropyl-4,4'-dihydroxy-stilbene.

Example 2

A mixture of 1 part of $\alpha,\alpha'$-diethyl-4,4'-dihydroxy-stilbene, 15 parts of pyridine and 5 parts of n-butyric acid anhydride is heated for some time at 120° C. The mixture is then allowed to cool and water is added whereby an oil is caused to separate. This is extracted by ether and washed successively with n-sulfuric acid, water and n/10 caustic soda solution. After evaporating the ether an oil remains which soon solidifies. This butyric acid di-ester is recrystallized from aqueous ethanol. It melts at 98–99° C.

In quite an analogous manner the other stilbene compounds named in the introduction hereto may be esterified.

Similarly are obtained the $\alpha,\alpha'$-diethyl-4,4'-dihydroxy-stilbene-di-iso-butyrate of melting point 101–102° C. and the $\alpha,\alpha'$-diethyl-4,4'-dihydroxy-stilbene-di-n-valerianate of melting point 76.5–77.5° C.

Example 3

3 parts of $\alpha,\alpha'$-diethyl-4,4'-dihydroxy-stilbene are mixed with 50 parts of pyridine and 4 parts of caproic acid chloride and the mixture is allowed to stand at room temperature for 12 hours. Water is then added and the precipitated oil is extracted by ether and the extract is washed successively with n-sulfuric acid, water and n/10 caustic soda solution. By evaporating the ether the dicaproic acid ester remains and may be recrystallized from dilute methonal. It melts at 75–76° C.

In an analogous manner there may be obtained α,α'-diethyl-4,4'-dihydroxy-stilbene- di -stearate of melting point of 84–86° C.

Example 4

3 parts of α,α'-diethyl-4,4'-dihydroxy-stilbene and 6 parts of caprylic acid bromide are mixed with 50 parts of pyridine and the mixture is allowed to stand at room temperature for 12 hours. It is then diluted with water and the precipitated oil is extracted by ether and the etheral solution washed. This solution is then dried over sodium sulfate and the ether is evaporated. The residual oil yields the di-caprylate when recrystallized from dilute methanol. The di-caprylate melts at 59–60° C.

Example 5

3 parts of α,α'-diethyl-4,4'-dihydroxy-stilbene are dissolved in excess of n/2 caustic soda solutions and the solution is vigorously shaken with 4.5 parts of benzoyl chloride. The solid benzoic acid di-ester which is precipitated is recrystallized from much butyl alcohol. It melts at 220–222° C.

Example 6

1 part of α,α'-diethyl-4,4'-dihydroxy-stilbene-dilaurate is mixed with 100 parts of methanol and there is added in the cold drop by drop 0.1 part of potassium hydroxide in 2 parts of methanol. The mixture is allowed to stand for 32 hours. The methanol is then evaporated in a vacuum and the residue taken up with 10 parts of water. The aqueous solution is then treated with ether to remove unsaponified di-ester. By acidifying the aqueous solution with n/2 sulfuric acid there is obtained an oil which is dissolved in ether, the ethereal solution being subsequently washed with sodium bicarbonate solution and water and then evaporated. By recrystallizing from dilute methanol there is obtained α,α'-diethyl-4,4'-dihydroxy-stilbene-monolauric acid ester in the form of colorless crystals.

In an analogous manner the mono-caproic acid ester may be obtained.

Example 7

1 part of α,α'-diethyl-4,4'-dihydroxy-stilbene-monocaproate is mixed with 40 parts of pyridine and 1 part of propionic anhydride and the mixture is heated for 1 hour at 100° C. and then allowed to stand over-night at room temperature. 100 parts of water are then added and the oil which is precipitated is dissolved in ether. After having been washed with n-sulfuric acid, water and n/10 caustic soda solution in succession the ethereal solution is dried and evaporated and the residue is recrystallized from dilute methanol. The α,α'-diethyl-4,4'-dihydroxy-stilbene propionic acid caproic acid ester is thus obtained in the form of colorless crystals.

Example 8

1 part of α,α'-diethyl-4,4'-dihydroxy-stilbene is dissolved in 15 parts of pyridine and after addition of 5 parts of isobutyric acid anhydride the whole is allowed to stand for 14 hours at 45° C. After cooling the mixture to 0° C. ice water is cautiously added. The isobutyric acid ester is thus precipitated in crystalline form and may be purified by recrystallization from dilute ethanol. It melts at 109–111° C.

Example 9

3 parts of α,α'-diethyl-4,4'-dihydroxy-stilbene are mixed with 50 parts of quinoline and 4 parts of capric acid chloride and the mixture is allowed to stand for 12 hours at 80° C. Water is then cautiously added and the oil thus precipitated is dissolved in ether and the ethereal solution is washed successively with n-sulfuric acid, water and n/10 caustic soda solution. By boiling down the dicapric acid ester is obtained. After recrystallization from dilute methanol it melts at 67–68° C.

Example 10

3 parts of α,α'-diethyl-4,4'-dihydroxy-stilbene are mixed with 50 parts of quinoline and 5 parts of palmitic acid chloride and the whole is allowed to stand for 14 hours at 80° C. The mass is then cautiously diluted with ice water and the product thus precipitated is extracted by ether. The ethereal solution is washed successively with dilute sulfuric acid, water and n/10 caustic soda solution, dried over sodium sulfate and evaporated to obtain the palmitic acid ester. The latter melts at 82–84° C. after recrystallization from dilute methanol.

What we claim is:

1. An α,α'-diethyl-4,4'-dihydroxy-stilbene di-fatty acid ester, the acid groups of which are identical and contain from 3 to 8 carbon atoms.
2. The dipropionate of α,α'-diethyl-4,4'-dihydroxy-stilbene.
3. The dibutyrate of α,α'-diethyl-4,4'-dihydroxy stilbene.
4. The dicaprylate of α,α'-diethyl-4,4'-dihydroxy stilbene.

KARL MIESCHER.
JULES HEER.